March 26, 1957  L. ZANETTI  2,786,390
PIVOTABLE LENS SPECTACLES
Filed April 5, 1955.
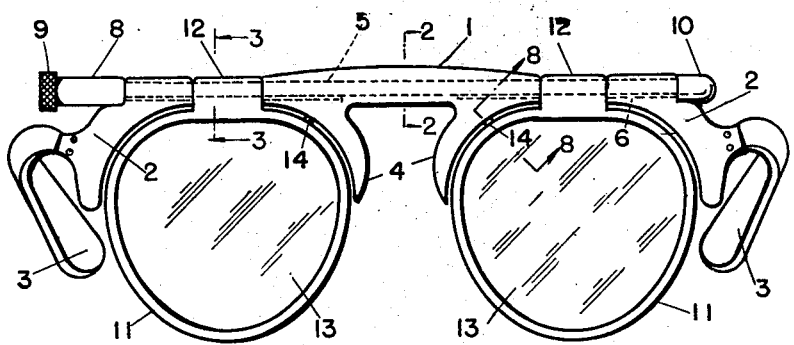
FIG. 1
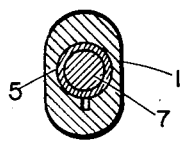
FIG. 2
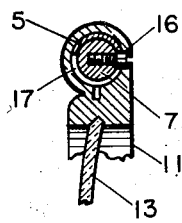
FIG. 3
FIG. 4
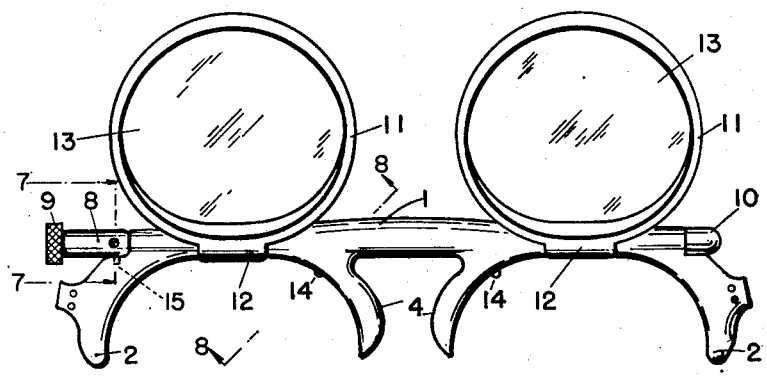
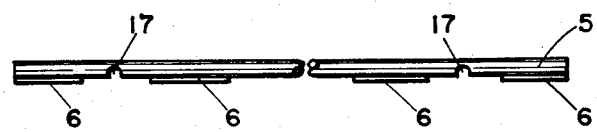
FIG. 5
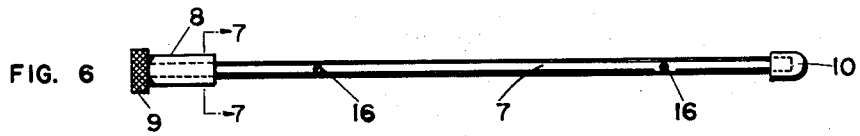
FIG. 6
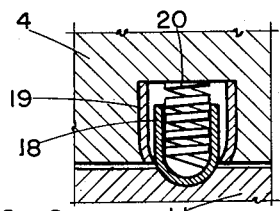
FIG. 8
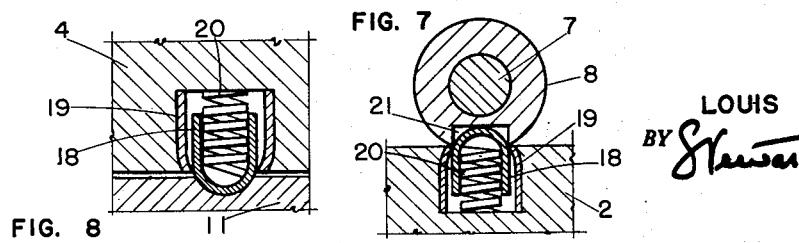
FIG. 7
*INVENTOR.*
LOUIS ZANETTI
BY
ATTORNEY

United States Patent Office 2,786,390
Patented Mar. 26, 1957

2,786,390

PIVOTABLE LENS SPECTACLES

Louis Zanetti, Coral Gables, Fla.

Application April 5, 1955, Serial No. 499,342

4 Claims. (Cl. 88—41)

This invention relates to spectacle construction and, more particularly, to a spectacle frame having a pivotable lens supporting sub-frame hingeable thereto.

Spectacles of the type to which my invention is applicable have utility in work demanding the viewing of objects at different focal distances and are employed by skilled artisans such as tool and die makers, as well as by dentists, surgeons and the like. Frequently, such persons have their hands ensheathed in gloves, making it inconvenient to replace their eyeglasses thereby delaying the work in hand as well as their fellow employees.

An object of the invention is to provide spectacles construction for the purposes described, which will be simple in assembly and efficient in use.

Another object is to provide spectacles construction which may be readily and economically manufactured.

A further object is to provide spectacles having a rigid stationary frame and readily pivotable lens rims retractable from their viewing or operative position.

Yet another object is to provide a construction in spectacles in which the parts may be readily replaced.

These and other advantages of the invention will be discernible from the detailed description of the spectacles herein exemplified.

The invention is embodied in structure shown by example in the accompanying drawing wherein the views are as follows, like reference characters designating identical parts throughout the several views:

Fig. 1, an elevation of the spectacles in operative viewing position;

Fig. 2, a section on line 2—2, Fig. 1;

Fig. 3, a section on line 3—3, Fig. 1;

Fig. 4, the view shown in Fig. 1 with lens frame in retracted position, temple bars omitted;

Fig. 5, an elevation of the shaft securing the stationary frame in rigid assembly;

Fig. 6, an elevation of the inner shaft and operating handle therefor;

Fig. 7, a section taken on line 7—7 of Fig. 4 and in part of Fig. 6; and

Fig. 8, a section taken on line 8—8 of Fig. 1 and in part of Fig. 4.

Referring now to the drawing, the spectacles have a stationary frame adapted to rest on the head of the wearer and comprising a central bridge 1, a pair of end brackets 2 spaced endwise therefrom, the usual pair of temple bars 3 hingeably connected to the end brackets, and a hollow shaft 5 passing laterally through a complementary bore formed in the bridge and the end brackets (Fig. 1). The shaft 5 has formed thereon a plurality of alined keys 6 (Fig. 5) engageable with complementary keyways slotted in the bores of bridge 1 and end brackets 2, whereby to impart rigidity to the stationary frame thus assembled.

The bridge carries the usual nose-pieces 4 which may depend integrally from the bridge or take the form of the conventional articulated pads and the like known in the art.

Axially received in the hollow shaft 5 (Figs. 2 and 3), is an inner shaft 7, rotatable therein by a handle member 8 terminating in a knurled knob 9. At the opposite end thereof, the inner shaft has mounted thereon a suitable boss or stud 10 to secure the same in the foregoing assembly.

Pivotably connected to the stationary frame thus far described, is a sub-frame comprising a pair of lens rims 11 carried by a corresponding pair of hinge blocks 12 and fitted with lenses or discs of a character suited to the uses to which the spectacles are to be put, shown in the figures at 13. The hinge blocks 12, interposed in the spaces between the bridge 1 and end brackets 2, are mounted for rotation on the hollow shaft 5 relative thereto and are operably connected to the inner shaft 7 for rotation thereby, a pair of radial pins 16 passing through the blocks 12 (Fig. 3) and being threadably engaged in the inner shaft. Clearance to permit the oscillatory movement of the pins 16 relative to the hollow shaft 5 is provided by slotting out the hollow shaft as at 17.

Thus, the lenses or discs 13 may be pivoted by turning the knob 9 between an operative position fronting the eyes of the wearer, and a retracted position in angular relation to their operative position.

This pivotable frame may be restrained in operative position by resilient stop means shown generally at 14 (Fig. 1), and by similar means in its retracted position shown generally at 15 (Fig. 4).

The stop means may consist of a cylindrical inner shell or latch member 18 having an open inner end and a domed outer end adapted to protrude from a cylindrical casing 19 (Figs. 7 and 8). This casing may be countersunk in suitable elements of the stationary frame, for example, in one of the nose-pieces 4 and the end bracket 2 adjacent the handle member 8 (Figs. 1 and 4). The latch member 18 has limited movement under the influence of a helical spring 20 arranged therebehind, the latch being confined to the casing by restricting the open end thereof to an inside diameter smaller than the outside diameter of the latch 18 whereby the dome portion thereof only may extend beyond the surface of the element, for example, the end bracket 2 (Fig. 7) for engagement with a suitable recess 21 slotted in the handle member 8. Thus, in the retracted position of the sub-frame, the lens rims 11 will be held in temporary restraint against movement but may be readily pivoted to operative position, the latch 18 yielding to the rotative force of the handle 8 when turned. Similarly, the abutting face of the rim 11 opposite the latch 18 (Fig. 8) may be recessed for engagement thereby to restrain the rims in their operative position, as will be understood from the foregoing description.

The hinge blocks 12, bored to receive the hollow shaft 5, are slotted by keyways which accommodate the keys 6 to permit the blocks to slide onto this shaft.

The invention will thus be seen to provide a unique spectacles structure permitting the ready assembly and disassembly of its component parts. By virtue of the hollow shaft 5, the construction hereinabove described provides not only a positive re-inforcing element for the operative support of the structure but makes possible the removal and replacement of any damaged or worn out member of the spectacles assembly without discarding integrally formed sub-assemblies otherwise undamaged. Again, the arrangement of the bifurcated nose-piece assembly so as to impose the mid portion of the weight of the spectacles against the sides of the wearer's nasal bridge area, rather than against the frontal part of this area, tends to minimize the "rocking" of the spectacles under the weight of the hand when manipulating the turning knob during oscillation of the pivotable frame between the operative and retracted positions, thus avoiding a momentary distortion of the objective under observation.

The device permits its use by dentists, machinists, opticians, and like specialists for work demanding diverse viewing conditions, it being understood that the characteristics of the lenses or discs 13 may range from optical material to total light-eliminating substances without departing from the scope of my invention.

Having thus described the invention and the mode of its practice being apparent from the description thereof, what I claim as new and desire to secure by Letters Patent is:

1. In a spectacles construction the combination of a stationary frame and a pivotable frame hingeable thereto, said stationary frame comprising a hollow shaft having a central bridge and a pair of end brackets sleeved thereover and in fixed relation therewith, said pivotable frame comprising an inner shaft axially received in said hollow shaft and rotatable therein, a pair of hinge blocks sleeved over the hollow shaft for rotation thereon and interposed intermediate the central bridge and the brackets on each side thereof, a pair of lens rims carried by said hinge blocks, said inner shaft terminating at one end thereof in a handle means, fastening means fixing the hinge blocks to said inner shaft whereby to pivot said lens frames between an operative position fronting the eyes of the wearer of said spectacles and a retracted position angularly related to said operative position upon the rotation of said handle means, and a pair of temple bars hingeable to said brackets.

2. The invention as defined in claim 1, and: resilient stop means interposed intermediate said stationary and pivotable frames to situate the pivotable frame in the operative and retracted positions thereof.

3. The invention as defined in claim 1, and: the stationary frame fixing means consisting of a plurality of key members formed longitudinally of said hollow shaft, the bridge and end brackets having complementary keyways to receive said key members.

4. The invention as defined in claim 1, and: resilient stop means interposed intermediate said stationary and pivotable frames to situate the pivotable frame in operative and retracted positions relative to the stationary frame, said stationary frame fixing means consisting of a plurality of key members formed longitudinally of said hollow shaft, the bridge and brackets having complementary keyways receiving said key members, and said hinge block fastening means consisting of radially disposed pins threaded into said inner shaft and passed through the hinge blocks, the hollow shaft being slotted in the wall thereof adjacent said pins to accommodate the pivotal movement thereof with said inner shaft, said bridge including a pair of downwardly and inwardly directed nosepieces depending therefrom and integral therewith and defining laterally spaced convex contact members adapted to clear the front of the wearer's nasal bridge area and to abut the sides thereof.

References Cited in the file of this patent

UNITED STATES PATENTS 2,510,539   Arbenz _____ June 6, 1950

FOREIGN PATENTS 20,229   Great Britain _____ Sept. 5, 1912